(12) United States Patent
Abbasfar et al.

(10) Patent No.: US 11,888,962 B2
(45) Date of Patent: *Jan. 30, 2024

(54) SYSTEM AND METHOD FOR TRANSITION ENCODING WITH FLEXIBLE WORD-SIZE

(71) Applicant: Samsung Display Co., Ltd., Yongin-si (KR)

(72) Inventors: Aliazam Abbasfar, San Jose, CA (US); Dale F. Stolitzka, San Jose, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/158,883

(22) Filed: Jan. 24, 2023

(65) Prior Publication Data
US 2023/0163941 A1    May 25, 2023

Related U.S. Application Data

(63) Continuation of application No. 17/556,899, filed on Dec. 20, 2021, now Pat. No. 11,637,685.

(60) Provisional application No. 63/239,281, filed on Aug. 31, 2021.

(51) Int. Cl.
H04L 7/00    (2006.01)

(52) U.S. Cl.
CPC .................. H04L 7/0087 (2013.01)

(58) Field of Classification Search
CPC ...................................... H04L 7/0087
See application file for complete search history.

(56) References Cited

U.S. PATENT DOCUMENTS

| 4,760,378 | A |   | 7/1988  | Iketani et al. |
| 5,420,866 | A |   | 5/1995  | Wasilewski |
| 5,490,269 | A |   | 2/1996  | Cohn et al. |
| 5,969,649 | A | * | 10/1999 | Ashley ............. H03M 5/145 341/59 |
| 6,070,164 | A |   | 5/2000  | Vagnozzi |
| 6,295,361 | B1 |  | 9/2001  | Kadansky et al. |
| 6,914,637 | B1 |  | 7/2005  | Wolf et al. |
| 8,724,243 | B1 |  | 5/2014  | Karabed et al. |
| 9,223,765 | B1 |  | 12/2015 | Alakuijala et al. |
| 9,591,002 | B2 |  | 3/2017  | El Khayat et al. |

(Continued)

FOREIGN PATENT DOCUMENTS

| CN | 1033343 A | * | 6/1989 | ......... H04L 12/5601 |
| CN | 1033343 A |   | 6/1989 | |

(Continued)

Primary Examiner — Freshteh N Aghdam
(74) Attorney, Agent, or Firm — Lewis Roca Rothgerber Christie LLP

(57) ABSTRACT

A method of encoding input data includes identifying an input packet of the input data, the input packet including a plurality of input words, each of the input words including pre bits, groupID bits, and post bits, organizing the plurality of input words into a plurality of groups based on groupID bits of the plurality of input words, identifying a key group of the plurality of groups based on a number of input words in each of the plurality of groups, determining a key value based on the pre bits, the groupID bits, and the post bits of one of the plurality of input words corresponding to the key group, and generating a plurality of coded words based on the key value and the plurality of input words.

20 Claims, 4 Drawing Sheets

(56) References Cited

U.S. PATENT DOCUMENTS

| | | | |
|---|---|---|---|
| 10,116,430 B1 * | 10/2018 | Jones | H04L 1/08 |
| 10,237,556 B2 | 3/2019 | Gamei et al. | |
| 10,291,354 B2 | 5/2019 | Richardson et al. | |
| 11,018,804 B2 | 5/2021 | Jiang et al. | |
| 2002/0047788 A1 | 4/2002 | McEwen et al. | |
| 2006/0083257 A1 * | 4/2006 | Price | H04L 12/44 |
| | | | 370/444 |
| 2008/0253562 A1 | 10/2008 | Nyberg | |
| 2020/0210284 A1 * | 7/2020 | Somasekhar | G06F 11/1012 |
| 2023/0037996 A1 * | 2/2023 | Kim | G11C 15/04 |

FOREIGN PATENT DOCUMENTS

| | | |
|---|---|---|
| CN | 110730067 A | 1/2020 |
| EP | 0162558 A2 | 11/1985 |
| EP | 0 649 106 A1 | 4/1995 |
| KR | 10-2010-0111628 A | 10/2010 |
| KR | 10-1405457 B1 | 6/2014 |
| KR | 10-2014-0111851 A | 9/2014 |
| KR | 10-1494510 B1 | 2/2015 |

\* cited by examiner

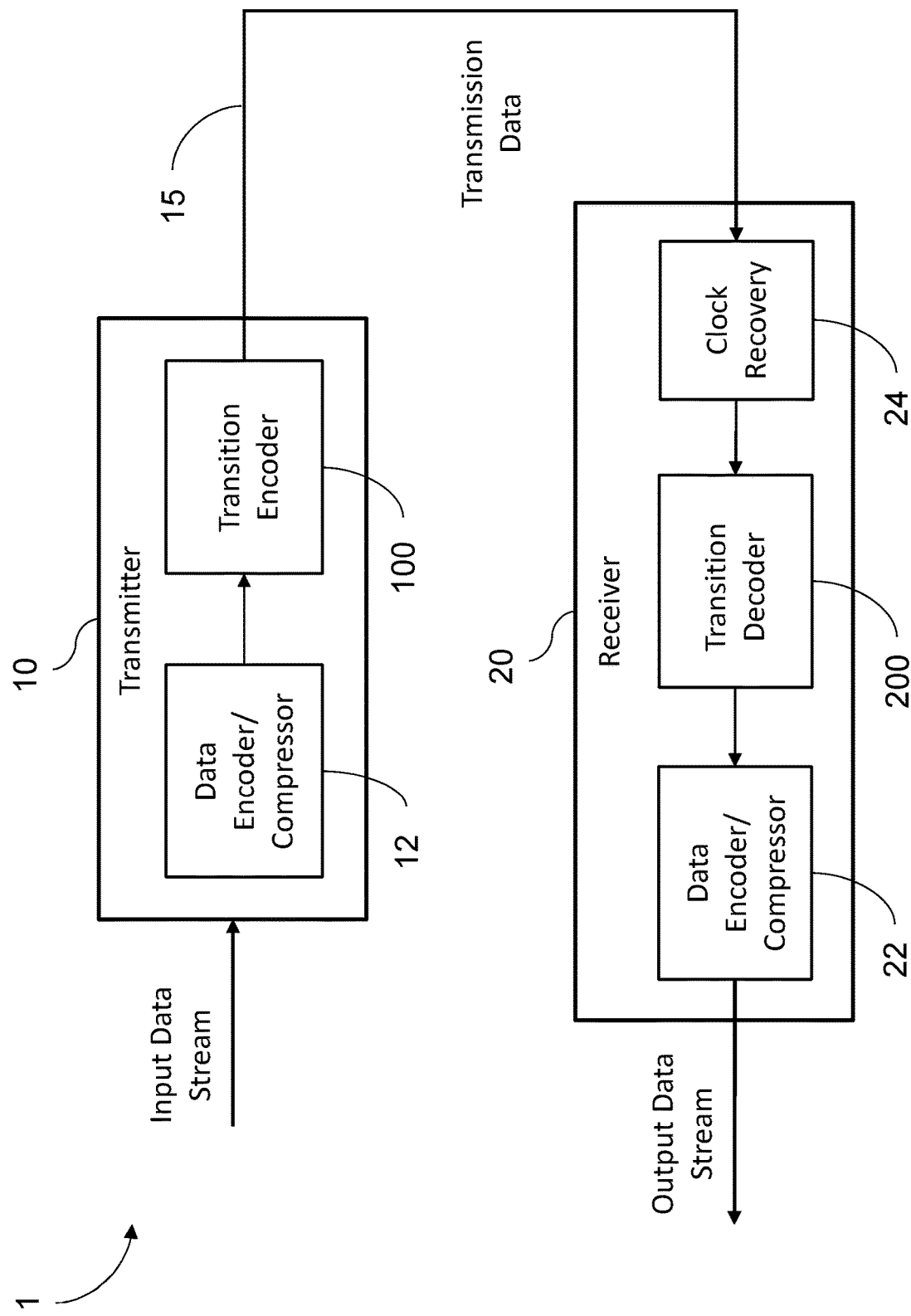

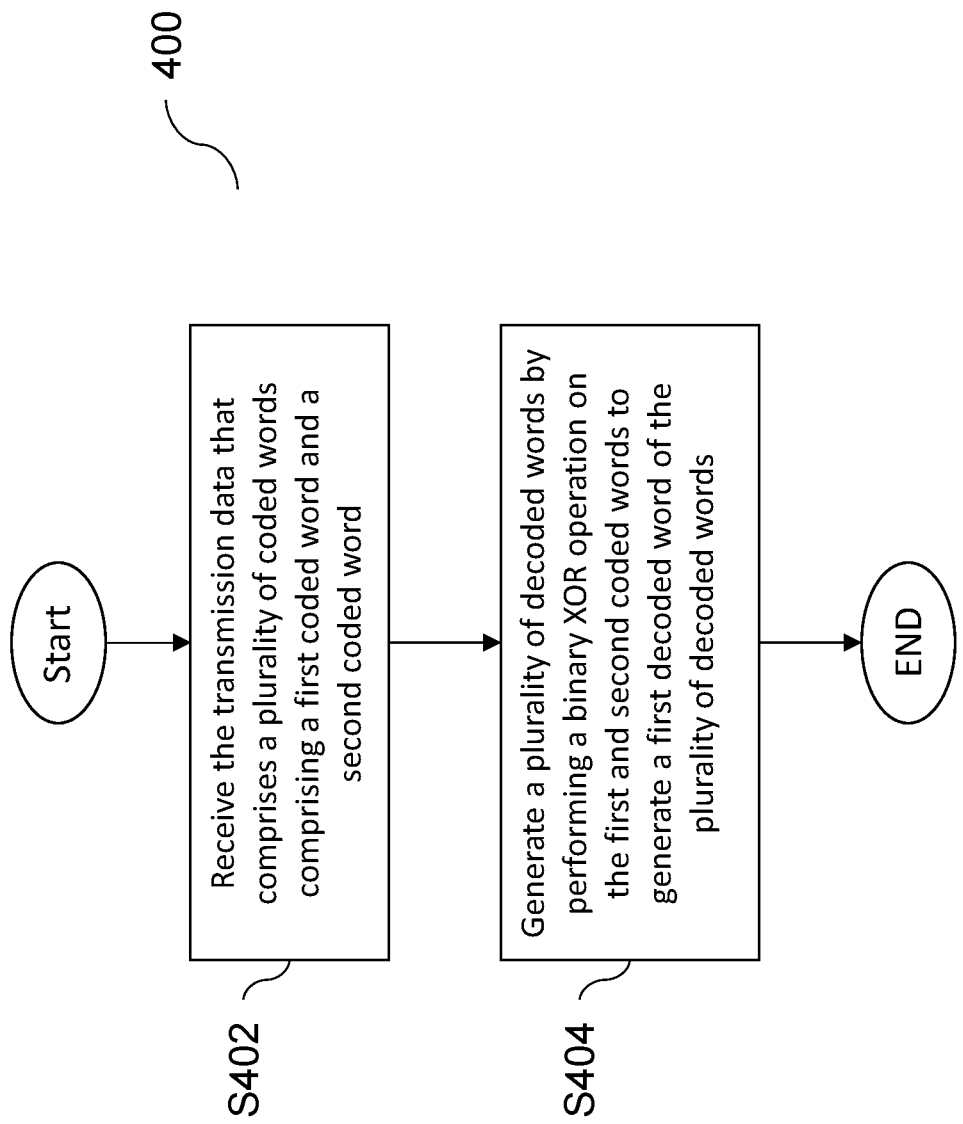

SYSTEM AND METHOD FOR TRANSITION ENCODING WITH FLEXIBLE WORD-SIZE

CROSS-REFERENCE TO RELATED APPLICATION(S)

This application is a continuation of U.S. patent application Ser. No. 17/556,899, ("SYSTEM AND METHOD FOR TRANSITION ENCODING WITH FLEXIBLE WORD-SIZE") filed on Dec. 20, 2021, which claims priority to, and the benefit of, U.S. Provisional Application No. 63/239,281 ("FLEXIBLE WORD-SIZE TRANSITION ENCODING CODES"), filed on Aug. 31, 2021, the entire contents of which are incorporated herein by reference.

FIELD

Aspects of embodiments of the present disclosure are generally related to data communication systems.

BACKGROUND

Generally, serial data communication is commonly used in a variety of systems communicating over wires, over optical fibers, and even wirelessly. In serial communication of digital data, when a transmitter does not transmit the clock signal with the data stream, the receiver has to regenerate the clock using the timing information from the data stream. The process of extracting timing information from a serial data stream is known as clock recovery and is crucial for allowing the receiver circuit to decode the transmitted symbols.

Clock recovery at the receiver can be assisted by modifying the transmitted data to ensure that there are a sufficient number of transitions within a data stream. In other words, the worst-case no-transition run-length has to be limited. To ensure frequent transitions, a transmitter may utilize a transition encoding algorithm to encode the raw data such that transitions happen regularly.

The above information disclosed in this Background section is only for enhancement of understanding of the present disclosure, and therefore it may contain information that does not form the prior art that is already known to a person of ordinary skill in the art.

SUMMARY

Aspects of embodiments of the present disclosure are directed to a system and method for transition encoding of a transmission stream with a flexible word size and run-length limit. In some embodiments, the transition encoding uses a subset of bits of each word in a data packet as the group ID for the word, organizes the words of the packet into different groups based on their group ID, identifies a key group with the least number of words, and then determines a coding key value based on the group ID and the missing bit patterns in the key group. The transition encoder then codes each word using the key value before transmitting the coded words to a receiver. In some embodiments, the transition encoding can be easily modified for any desirable word size and run-length limit.

According to some embodiments of the present invention, there is provided a method of encoding input data, the method including: identifying an input packet of the input data, the input packet including a plurality of input words, each of the input words including pre bits, groupID bits, and post bits; organizing the plurality of input words into a plurality of groups based on groupID bits of the plurality of input words; identifying a key group of the plurality of groups based on a number of input words in each of the plurality of groups; determining a key value based on the pre bits, the groupID bits, and the post bits of one of the plurality of input words corresponding to the key group; and generating a plurality of coded words based on the key value and the plurality of input words.

In some embodiments, the method of claim further includes: receiving the input data; and dividing the input data into a plurality of data packets including the input packet.

In some embodiments, each of the input words is expressed as: [$PRB_i$ $GID_i$ $POB_i$], where $PRB_i$ represents the pre bits, $GID_i$ represents the groupID bits, and $POB_i$ represents the post bits, and i is an integer greater than 0.

In some embodiments, the input packet includes 31 input words, each of the plurality of input words includes 8 bits, the pre bits include two of the most significant bits of a corresponding word of the plurality of input words, the groupID bits include 4 middle bits of the corresponding word, and the post bits include 2 least significant bits of the corresponding word, the plurality of groups include 8 groups, and a run-length of the input packet is 10.

In some embodiments, the organizing the plurality of input words into a plurality of groups includes: grouping ones of the plurality of input words having the same groupID bits or having complements of the same groupID bits into a same one of the plurality of groups, and a number of the plurality of groups is one half of a number of bits in the groupID bits.

In some embodiments, the organizing the plurality of input words into a plurality of groups includes: grouping one of the plurality of input words having a groupID bits value that is less than $(2^g-1)/2$ and equal to a first value, and another of the plurality of input words having a groupID bits value that is greater than $(2^g-1)/2$ and equal to a complement of the first value in a same group, where g represent a bit length of the groupID bits.

In some embodiments, identifying the key group includes: identifying the key group as one among the plurality of groups a fewest number of input words or having a number of input words below a threshold.

In some embodiments, the determining the key value includes: determining key groupID bits as groupID bits of a word of the plurality of input words corresponding to the key group; determining key pre bits as bits missing from the pre bits of ones of the plurality of input words corresponding to the key group; determining key post bits as bits missing from the post bits of ones of the plurality of input words corresponding to the key group; and generating the key value based on the key pre bits, the key groupID bits, and the key post bits.

In some embodiments, the key value is expressed as: [$PRB_0$ $GID_0$ $POB_0$], where $PRB_0$ represents the key pre bits, $GID_0$ represents the key groupID bits, and $POB_0$ represents the key post bits.

In some embodiments, the key value has a same bit length as one of the plurality of input words, and is not the same as any one of the plurality of input words.

In some embodiments, the plurality of coded words includes a first coded word and a second coded word, the first coded word being based at least on the key value and the second coded word being based on the key value and a first input word of the plurality of input words.

In some embodiments, the generating the plurality of coded words includes: generating a modified key value based on the key value; generating the first coded word as the modified key value; and generating the second coded word by performing a binary XOR operation on one of the plurality of input words and the key value.

In some embodiments, the plurality of coded words is expressed as: {K', $x_1$^K, $x_2$^K, . . . , $x_N$^K}, where K represents the key value, K' represents the modified key value, $x_1, x_2, \ldots, x_N$ represent the plurality of input words of the input packet, N is an integer greater than 2, and ^ symbolizes a binary XOR operation.

In some embodiments, the method further includes: transmitting transmission data to a receiver through a communication channel, the transmission data including the plurality of coded words.

According to some embodiments of the present invention, there is provided a transition encoder for encoding input data, the transition encoder including: a processor; and a processor memory local to the processor, wherein the processor memory has stored thereon instructions that, when executed by the processor, cause the processor to perform: identifying an input packet of the input data, the input packet including a plurality of input words, each of the input words including pre bits, groupID bits, and post bits; organizing the plurality of input words into a plurality of groups based on groupID bits of the plurality of input words; identifying a key group of the plurality of groups corresponding to a number of input words less than a threshold; determining a key value based on the pre bits, the groupID bits, and the post bits of one of the plurality of input words corresponding to the key group; and generating a plurality of coded words based on the key value and the plurality of input words.

According to some embodiments of the present invention, there is provided a method of decoding transmission data, the method including: receiving the transmission data that includes a plurality of coded words including a modified key value, a first coded word; generating a key value based on the modified key value; and generating a first decoded word of a plurality of decoded words by performing a binary XOR operation on the key value and the first coded word.

In some embodiments, the modified key value is expressed as: [$PRB_0$ $GID_0$ $POB_0$], where $PRB_0$ represents pre bits of the modified key value, $GID_0$ represents groupID bits of the modified key value, and $POB_0$ represents post bits of the modified key value, and the generating the key value based on the modified key value includes: replacing a most significant bit (MSB) of the groupID bits of the key value with zero to generate the key value In some embodiments, the generating the key value based on the modified key value includes: setting a bit from among bits of the modified key value to zero to generate the key value.

In some embodiments, the plurality of coded words is expressed as: {K', $x_1$^K, $x_2$^K, . . . , $x_N$^K} where {$x_1$, $x_2, \ldots, x_N$} represent a plurality of words of an input packet, K represents the key value used to code the plurality of coded words, K' represents the modified key value, and ^ symbolizes the binary XOR operation.

In some embodiments, the receiving the transmission data includes: receiving the transmission data from a transmitter through a communication channel.

BRIEF DESCRIPTION OF THE DRAWINGS

The accompanying drawings, together with the specification, illustrate example embodiments of the present disclosure, and, together with the description, serve to explain the principles of the present disclosure.

FIG. 1A is a block diagram of a serial data communication system, according to some embodiments of the present disclosure.

FIG. 4 illustrates a process of decoding transmission data, according to some embodiments of the present disclosure.

DETAILED DESCRIPTION

The detailed description set forth below is intended as a description of example embodiments of a system and method for transition encoding/decoding data in serial data communication, provided in accordance with the present disclosure, and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In the related art, to achieve run-length-limited transmission, a transmitter may convert input data to coded words for transmission by identifying a key based on the input data, encoding each word of the input data using the key, and transmitting the key along with the coded words to a receiver. The coded data may have a specific run-length limit. The receiver in turn identifies the key in the transmission data and uses it to decode the received coded words to obtain the original input data. However, the encoders of the related art often work with word sizes that do not align with (i.e., are different from) the byte-size serial data generated by a protocol layer. For example, the protocol layer may generate data in units of 8-bit bytes, while the encoder may perform transition encoding on units of 6 bits. As such, the encoder may have to utilize bit padding/stuffing in transition encoding packets, which can increase coding overhead, or rely on additional alignment hardware, which can occupy chip real estate and add additional cost and complexity.

According to some embodiments, the transition encoder is capable of encoding byte-sized data, or a word size having any suitable number of bits, to produce various run-length limits. The transition encoder may also have any suitable run-length limit, and is not limited to a particular run-length. This eliminates the need for bit padding or additional byte-word alignment hardware, which can simplify the transmitter/receiver design and reduce system cost.

Figure 1B:
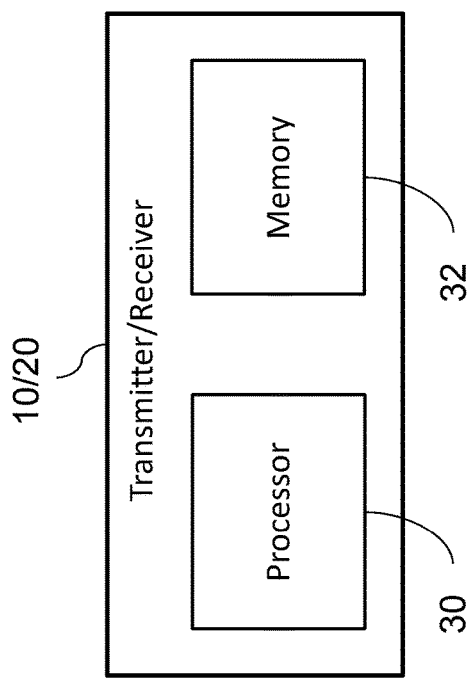
FIG. 1B illustrates a block diagram of a transmitter/receiver of the serial data communication system, according to some embodiments of the present disclosure.

FIG. 1A is a block diagram of a serial data communication system 1, according to some embodiments of the present disclosure. FIG. 1B illustrates a block diagram of a transmitter/receiver of the serial data communication system 1, according to some embodiments of the present disclosure.

Referring to FIG. 1A, in some embodiments, the serial data communication system 1 includes a transmitter 10, a communication channel (e.g., serial communication channel) 15, and a receiver 20. The transmitter 10 may include a data compressor and/or encoder 12 for performing compression and/or encoding on an input data stream to generate transmission data for transmission through the communication channel 15 (e.g., a transmission line with one or more conductors) to the receiver 20. The receiver 20 may include a data decompressor and/or decoder 22 for performing decompression and/or decoding on the data stream received by the receiver 20 to recover the input data stream.

According to some embodiments, the transmitter 10 includes a transition encoder 100 configured to encode the transmission data stream by ensuring that transitions occur with at least a particular frequency that enables the receiver 20 to extract the clock signal from the coded data stream (e.g., transition-encoded) transmitted over the communication channel 15. That is, the transition encoder 100 limits the run-length of the coded data stream.

As shown in FIG. 1B, the operations performed by the constituent components of the transmitter 10 and the receiver 20 may be performed by a "processing circuit" or "processor" 30 that may include any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed wiring board (PWB) or distributed over several interconnected PWBs. A processing circuit may contain other processing circuits; for example, a processing circuit may include two processing circuits, an FPGA and a CPU, interconnected on a PWB. A processor memory 32 that is local to the processor 30 may have stored thereon instructions that, when executed by the processor 30, cause the processor 30 to perform the operations described herein with respect to FIGS. 1A and 2-4.

Figure 2:
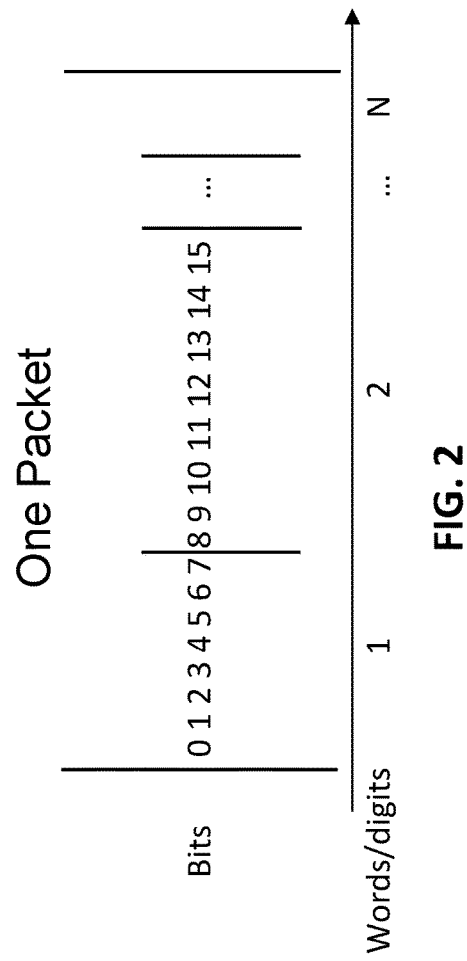
FIG. 2 illustrates a packet of data that is partitioned into a number of words, according to some embodiments of the present disclosure.

FIG. 2 illustrates a packet of data that is partitioned into a number of words, according to some embodiments of the present disclosure.

Referring to FIGS. 1A and 2, in some embodiments, the transition encoder 100 divides the input data (that may or may not have been encoded/compressed by the data compressor and/or encoder 12) into a number of input data packets (e.g., bit streams). Each input data packet (also referred to as an input packet) is partitioned into N words/digits, where each word/digit contains q bits. Thus, the data packet X may be represented as:

$$X[0:q \times N-1] = x_1(b[0:q-1]), x_2(b[q:2q-1]), \ldots, x_N(b[q \times (N-1):(q \times N)-1]) \quad \text{Eq}(1)$$

where $x_1, x_2, \ldots, x_N$ represent the N words/digits making up the input packet, and each has a value between 0 to $2^{q-1}$. In the example of FIG. 2, each word includes 8 bits (i.e., q=8) and has a value in the [0:255] range. However, embodiments of the present invention are not limited thereto, and each word may include any suitable number of bits (e.g., 6 bits, 10 bits, etc.).

The transition encoder 100 encodes/scrambles each word to ensure transitions in every word/digit and to limit the run-length of the transmitted data to a desired value. In some embodiments, the transition encoder 100 encodes the words of a packet in such a way as to prevent words having leading or trailing run-lengths of more than run-length/2 from being transmitted. In the example of 8-bit words and a desired transmission run-length of 10, the transition encoder 100 eliminates the following words:

000000xx
   xx000000
   111111xx
   xx111111 where 'x' can be zero or one (a "don't-care bit"). As such, the worst case scenario for runs in two consecutive words is xx100000 000001xx and xx011111 111110xx, which both have a run-length of 10.

To encode the received input words, the transition encoder 100 first partitions the bits of each input word into pre bits (PRB), group ID bits (GID), and post bits (POB). That is, each input word may be expressed as [PRB GID POB], where the PRB are the most significant bits, the GID are the middle bits, and the POB are the least significant bits of the input word. The number of middle bits in GID may expressed as:

$$\text{Number of bits in } GID: g = RL - WBL + 2 \quad \text{Eq}(2)$$

Where RL represents the desired coding run length and WBL represents the input word bit length. In the example above, the number of bits in the GID equals 4 (=10−8+2). Thus, the forbidden bits above may be partitioned into a two-bit PRB, 4-bit GID, and 2-bit POB as shown in Table 1 below:

TABLE 1

| Forbidden words | PRB | GID | POB |
| --- | --- | --- | --- |
| 000000xx | 00 | 0000 | 00 |
| xx000000 | xx | 0000 | 00 |
| 111111xx | 11 | 1111 | xx |
| xx111111 | xx | 1111 | 11 |

As observed from the Table 1, if the GID are not all zeros or all ones, then forbidden words may be avoided. Also, when the GID are all zeroes or all ones, forbidden words may be avoided if and only if neither the PRB nor the POB are all the same bits as the GID. Accordingly, the transition encoder 100 encodes the GID of input words such that most of coded words do not have GID equal to all zeroes or all ones, and encodes the PRB and POB such that the coded words with GID of all zeroes or all ones do not have all zeroes or all ones similar to the GID.

In some embodiments, once the words are partitioned, the input words are grouped together based on their GIDs. Here, words with the same GIDs and complement (i.e., 1's complement) GIDs (e.g., 0000 and 1111) are grouped together. That is, when the GID has g bits, those words with GID value less than $(2^g-1)/2$ are organized in group numbers matching the GID, and those words with GID values above $(2^g-1)/2$ are organized in group numbers matching their complement (inverse) GID. As such, the number of groups into which the input words are organized are equal to $2^{g-1}$. The group of input words that are organized based on their GIDs may be referred to as regular words, and those input words that are organized based on their complement GID may be referred to complement words.

The organization of the input words into different groups may be visualized with the aid of Table 2 below. In the example of Table 2, each input word of the example packet has 8 bits, the GID has 4 bits (i.e., g=4), and the PRB and POB each have two bits. Thus, the transition encoder 100 organizes the input words into 8 groups (i.e., 0 to 7)

TABLE 2

| Group | Words | GID | PRB | POB | Coded words | New group |
|---|---|---|---|---|---|---|
| 0 | 00-0000-01 | | | | 00-0001-01 | 1 |
| 0000 | 10-0000-11 | | | | 10-0001-11 | 0001 |
| 5 members | 11-0000-10 | | | | 11-0001-10 | |
| | 00-1111-01 | | | | 00-1110-01 | |
| | 11-1111-10 | | | | 11-1110-10 | |
| 1 | 11-0001-10 | 0001 | 11 | 10 | 11-0000-10 | 0 |
| 0001 | 10-0001-11 | 0001 | 10 | 11 | 10-0000-11 | 0000 |
| 3 members | 10-1110-01 | inv(0001) | inv(01) | inv(10) | 10-1111-01 | |
| | | GID0 = 0001 | PRB0 = 00 | POB0 = 00 | | |
| ... | | | | | | ... |
| 7 | 01-0111-00 | | | | 01-0110-00 | 6 |
| 0111 | 11-1000-10 | | | | 11-1001-10 | 0110 |
| 4 members | 01-1000-11 | | | | 01-1001-11 | |
| | 11-1000-01 | | | | 11-1001-01 | |

In some embodiments, the transition encoder 100 identifies a group with the least number of members (e.g., group 1 in Table 2) or a group having a number of members below a threshold (e.g., 4), which is referred to as the key group. The GID or complement GID of any of the words in a key group may represent the group GID. In the example of Table 2, group 1, which has the least number of word members (i.e., three) is identified as the key group. The words in this group have a GID (or complement GID) of 0001. As such, either 0001 or 1110 may be identified as the GID of the key group (which may be referenced as GID0). In some embodiments, the GID (and not the complement GID) of the key group is selected as GID0. It may be assumed then that the most significant bit (MSB) of the GID0 is zero, and only the remaining bits of the GID0 (e.g., 001 in the example of Table 2) may be transmitted to the receiver 20. Consistent with this scheme, the receiver 20 may append the MSB of zero to the remaining bits (e.g., 001) of the GID0 received from the transmitter 10. By not transmitting the MSB of zero, the transition encoder 100 may achieve an improved code efficiency for transmitting fewer overhead bits.

In embodiments in which the GID0 of the key group is based on the GID of the member words (e.g., GID0=0001), the PRBs of the key group are identified as PRBs of any regular words and the complement PRBs of any complement words. The PRB and POB of the key group may be referred to as PRB0 and POB0. When the GID0 of the key group is based on the complement GID of the member words (e.g., GID0=1110), PRB0 and POB0 may be based on the missing bit pattern from the complement PRB and POB of the corresponding regular member words and the PRB and POB of the corresponding complement words.

The transition encoder 100 then generates a coding key value (also referred to simply as "key value") based on the GID, PRBs, and POBs of the key group. According to some embodiments, the transition encoder 100 uses the GID of the key group as the GID of the key value (GID0), and determines the PRB and POB of the key value (i.e., PRB0 and POB0) as bit patterns that are missing from the PRBs and POBs, respectively, of the key group. When more than one bit pattern are missing from PRB/POB, any of the missing patterns may be used as PRB0/POB0. In the example of Table 2, GID0 may be 0001, PRB is 00, and POB may be 00 or 01. Therefore, the key value may be [00 0001 00], [00 0001 01], [00 1110 00], or [00 1110 01]. Here, the key value has the same number of bits (i.e., bit length) as the input words.

In the example of Table 2 in which a packet includes 31 words, at least one group will have 3 or fewer members. As such, one can find one or more bit patterns that are missing from the PRB and POB of the key group. This condition may be satisfied so long as the number N of words in the input packet is less than the number of groups times the number of possible pattern in PRB/POB fields (in the example of Table 2, there are 8 groups and 4 patterns in PRB and POB, thus the packet size is less than 8×4=32).

In some embodiments, the transition encoder 100 encodes the input words using the key values to generate a coded packet that includes a plurality of coded words for transmission to the receiver 20. Each coded word is the result of performing an XOR operation on a corresponding input word and the key value. As such, the coded packet Y may be expressed as:

$$Y=\{y_0, y_1, \ldots, y_N\}=\{K, x_1 \wedge K, x_2 \wedge K, \ldots, x_N \wedge K\} \quad \text{Eq(3)}$$

where K represents the key value, $x_1, x_2, \ldots, x_N$ represent the N input words making up the input packet, and the symbol ∧ symbolizes the binary XOR operation. As the coded packet includes the key value as well as the coded words, the word length of the coded packet is one greater than the converted packet (i.e., it includes N+1 words). Here, the entire keyword is transmitted to the receiver as coded word $y_0$; however, embodiments of the present disclosure are not limited thereto. For example, the transition encoder 100 may construct a modified key value K' and transmit that, rather than the key value K, to the receiver 20. In embodiments in which the MSB of the GID0 of the key value is assumed to be zero, the transition encoder 100 may construct the modified key value K' to be the same as the key value K whose MSB of the GID0 is replaced with the complement of the next significant bit of the GID0. For example, referring to Table 2, when the GID0 of the key value is 0001, the GID0 of the modified key value may be 1001. This may be done to ensure that there is a transition in the K' and that the run-length is not violated during transmission of K'. In such embodiments, the coded packet Y may be expressed as:

$$Y=\{y_0, y_1, \ldots, y_N\}=\{K', x_1 \wedge K, x_2 \wedge K, \ldots, x_N \wedge K\} \quad \text{Eq(4)}$$

While Equations 3 and 4 express the key value/modified key value as the first word of the coded packet, embodiments of the present disclosure are not limited thereto. For example, the key value/modified key value may be the last word in the coded packet Y, or may have any other suitable position within the packet as long as the receiver 20 is aware of the position of the key value/modified key value within the packet. Because of the manner in which the key value/modified key value is determined, the coded words exhibit the desired run-length, which allows the receiver 20 to recover the clock from the transmitted packet.

Table 2 provides the coded values that are generated based on the example input words and the generated key value. Because the GID of the key value (and, equivalently, the GID of the key group) is by definition different from that of other groups, XORing the key value the input words of the other groups results in a bit transition in the GIDs of the resulting coded words. Thus, the GID of the key value ensures a run length of 10 for at least those words corresponding to groups other than the key group, as shown in Table 2. Further, using a PRB0 and POB0 of the key value that is different from the PRB and POB of the words of the key group ensures that XORing the words within the key group with the key value results in bit transitions (i.e., consecutive 0 and 1 bits) in both the PRB and POB of the coded words. As a result, even the words within the key group are encoded to satisfy the desired run-length (of, e.g., 10 in Table 2).

The transmitter 10 communicates the coded packet Y to the receiver 20 via the communication channel 15. In embodiments in which the coded packet Y includes the key value K (as, e.g., in Equation 3), once the coded packet is received by the receiver 20, the transition decoder 200 identifies the key value (e.g., the first word in the received packet), and decodes remaining coded words based on the key value to generate a decoded packet X', which is expressed as $\{x'_1, x'_2, \ldots, x'_N\}$. The transition decoder 200 performs an XOR operation on the second and later words with the key value. In some embodiments, the decoded word $x'_i$ (i being an integer greater than or equal to 1) may be expressed as:

$$x'_i = y_i \hat{} K = (x_i \hat{} K) \hat{} K = x_i \qquad \text{Eq(5)}$$

Therefore, the transition decoder 200 may retrieve the original input words. In embodiments in which the coded packet includes the modified key value K' (instead of the key value K, as expressed in Equation 4, for example), the transition decoder 200 identifies the modified key value (e.g., the first word in the received packet), generates the key value K based on the modified key value K' by replacing the MSB of the GID0 of the key value with zero, and proceeds to decode the remaining coded words based on the key value K, as described above.

Figure 3:
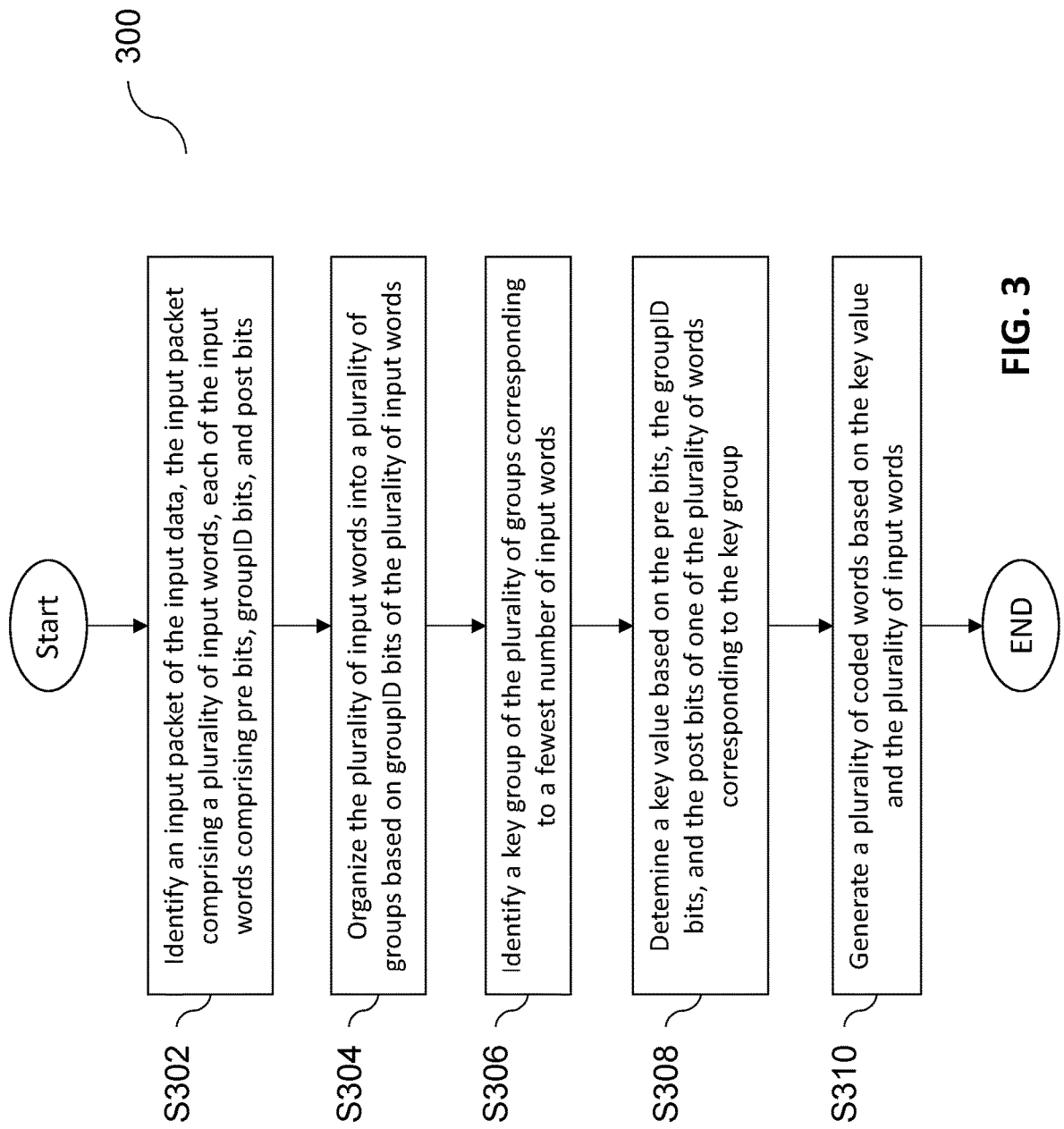
FIG. 3 illustrates a process of encoding input data, according to some embodiments of the present disclosure.

FIG. 3 illustrates a process 300 of encoding input data, according to some embodiments of the present disclosure.

When processing input data for transition, the transmitter encoder 100 receives the input data (e.g., input data stream), divides the input data into a plurality of data packets, and identifies an input packet of the input data (S302). The input packet includes a plurality of input words, each of which includes pre bits, groupID bits, and post bits.

In some embodiments, the transmitter encoder 100 organizes the plurality of input words into a plurality of groups based on groupID bits of the plurality of input words (S304). In so doing, the transmitter encoder 100 groups ones of the plurality of input words having the same groupID bits and the same complement groupID bits into a same one of the plurality of groups. In some embodiments, the transmitter encoder 100 groups one of the plurality of input words having a groupID bits value that is less than $(2^g-1)/2$ and equal to a first value, and another of the plurality of input words having a groupID bits value that is greater than $(2^g-1)/2$ and equal to a complement of the first value in a same group, where g represent a bit length of the group ID bits. The number of the plurality of groups may be one half of a number of bits in the groupID bits.

In some examples, the input packet includes 31 input words, each of the plurality of input words includes 8 bits, the pre bits include two of the most significant bits of a corresponding word of the plurality of input words, the groupID bits include 4 middle bits of the corresponding word, and the post bits include 2 least significant bits of the corresponding word, the plurality of groups include 8 groups, and a run-length of the input packet is 10. The transmitter encoder 100 then identifies a key group from among the plurality of groups that has the fewest number of input words (S306).

In some embodiments, the transmitter encoder 100 determines a key value based on the pre bits, the groupID bits, and the post bits of one of the plurality of words corresponding to the key group (S308). In so doing, the transmitter encoder 100 determines the key groupID bits as groupID bits of a word of the plurality of input words corresponding to the key group, determines key pre bits as bits missing from the pre bits of ones of the plurality of input words corresponding to the key group, determines key post bits as bits missing from the post bits of ones of the plurality of input words corresponding to the key group, and generates the key value based on the key pre bits, the key groupID bits, and the key post bits. Here, the key value has a same bit length as one of the plurality of input words, and is not the same as any one of the plurality of input words.

The transmitter encoder 100 generates a plurality of coded words based on the key value and the plurality of input words (S310). The plurality of coded words includes a first coded word and a second coded word, where the first coded word is based at least on the key value and the second coded word is based on the key value and the first converted word. The transmitter encoder 100 generates the coded words by generating the first coded word as the key value, and generating the second coded word by performing a binary XOR operation on one of the plurality of input words and the key value.

The transmitter encoder 100 then transmits the transmission data, which includes the coded words, to receiver 20 through the communication channel 15.

FIG. 4 illustrates a process 400 of decoding transmission data, according to some embodiments of the present disclosure.

In some embodiments, the receiver 20 receives the transmission data, which includes a plurality of coded words (S402), from the transmitter 10 through the communication channel 15. The coded words include a first coded word and a second coded word. In some examples, the first and second coded words may be consecutive words. The receiver 20 (e.g., transition decoder 200) generates a plurality of decoded words by performing a binary XOR operation on the first and second coded words to generate a first decoded word of the plurality of decoded words (S404). The bit length of the first coded word may be the same as that of the first decoded word.

As described above, the transition encoder 100 according to some embodiments is capable of encoding data with any suitable word size to produce any suitable run-length limit. In some embodiments, the transition encoder 100 enables this desirable feature by determining a key value based on input data in a particular manner, which eliminates the need for the implementation of byte-to-word alignment hardware or bit padding, simplifies the transmitter/receiver design and reduce overall system cost. Moreover, the communication system 1, according to some embodiments, achieves this desirable effect without adding any overhead to the transition encoding scheme.

It will be understood that, although the terms "first", "second", "third", etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section, without departing from the scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Further, the use of "may" when describing embodiments of the inventive concept refers to "one or more embodiments of the inventive concept". Also, the term "exemplary" is intended to refer to an example or illustration.

As used herein, the terms "use", "using", and "used" may be considered synonymous with the terms "utilize", "utilizing", and "utilized", respectively.

Further, the use of "may" when describing embodiments of the inventive concept refers to "one or more embodiments of the inventive concept." Also, the term "exemplary" is intended to refer to an example or illustration.

While this disclosure has been described in detail with particular references to illustrative embodiments thereof, the embodiments described herein are not intended to be exhaustive or to limit the scope of the disclosure to the exact forms disclosed. Persons skilled in the art and technology to which this disclosure pertains will appreciate that alterations and changes in the described structures and methods of assembly and operation can be practiced without meaningfully departing from the principles, and scope of this disclosure, as set forth in the following claims and equivalents thereof.

What is claimed is:

1. A method of encoding input data, the method comprising:
   identifying an input packet of the input data, the input packet comprising a plurality of input words;
   organizing the plurality of input words into a plurality of groups;
   identifying a key group of the plurality of groups;
   determining a key value based on one of the plurality of input words corresponding to the key group; and
   generating a plurality of coded words based on the key value and the plurality of input words.

2. The method of claim 1, further comprising:
   receiving the input data; and
   dividing the input data into a plurality of data packets comprising the input packet.

3. The method of claim 1, wherein each of the input words is expressed as:

$[PRB_i GID_i POB_i]$, where $PRB_i$ represents pre bits, $GID_i$ represents groupID bits, and $POB_i$ represents post bits, and i is an integer greater than 0.

4. The method of claim 1, wherein each of the input words comprising pre bits, group identification (groupID) bits, and post bit, and
   wherein the input packet comprises 31 input words, each of the plurality of input words comprises 8 bits, the pre bits comprise two of the most significant bits of a corresponding word of the plurality of input words, the groupID bits comprise 4 middle bits of the corresponding word, and the post bits comprise 2 least significant bits of the corresponding word, the plurality of groups comprise 8 groups, and a run-length of the input packet is 10.

5. The method of claim 1, wherein each of the input words comprising pre bits, group identification (groupID) bits, and post bit, and
   wherein the organizing the plurality of input words into a plurality of groups comprises:
      grouping ones of the plurality of input words having the same groupID bits or having complements of the same groupID bits into a same one of the plurality of groups, and
   wherein a number of the plurality of groups is one half of a number of bits in the groupID bits.

6. The method of claim 1, wherein each of the input words comprising pre bits, group identification (groupID) bits, and post bit, and
   wherein the organizing the plurality of input words into a plurality of groups comprises:
      grouping one of the plurality of input words having a groupID bits value that is less than $(2^g-1)/2$ and equal to a first value, and another of the plurality of input words having a groupID bits value that is greater than $(2^g-1)/2$ and equal to a complement of the first value in a same group, where g represent a bit length of the groupID bits.

7. The method of claim 1, wherein identifying the key group comprises:
   identifying the key group as one among the plurality of groups having a fewest number of input words or having a number of input words below a threshold.

8. The method of claim 1, wherein each of the input words comprising pre bits, group identification (groupID) bits, and post bit, and
   wherein the determining the key value comprises:
      determining key groupID bits as groupID bits of a word of the plurality of input words corresponding to the key group;
      determining key pre bits as bits missing from pre bits of ones of the plurality of input words corresponding to the key group;
      determining key post bits as bits missing from post bits of ones of the plurality of input words corresponding to the key group; and
      generating the key value based on the key pre bits, the key groupID bits, and the key post bits.

9. The method of claim 8, wherein the key value is expressed as:

$[PRB_0 GID_0 POB_0]$, where $PRB_0$ represents the key pre bits, $GID_0$ represents the key groupID bits, and $POB_0$ represents the key post bits.

10. The method of claim 1, wherein the key value has a same bit length as one of the plurality of input words, and is not the same as any one of the plurality of input words.

11. The method of claim 1, wherein the plurality of coded words comprises a first coded word and a second coded word, the first coded word being based at least on the key value and the second coded word being based on the key value and a first input word of the plurality of input words.

12. The method of claim 11, wherein the generating the plurality of coded words comprises:
generating a modified key value based on the key value;
generating the first coded word as the modified key value; and
generating the second coded word by performing a binary XOR operation on one of the plurality of input words and the key value.

13. The method of claim 1, wherein the plurality of coded words is expressed as:

$$\{K', x_1 \wedge K, x_2 \wedge K, \ldots, x_N \wedge K\},$$

where K represents the key value, K' represents a modified key value based on the key value, $x_1, x_2, \ldots, x_N$ represent the plurality of input words of the input packet, N is an integer greater than 2, and ^ symbolizes a binary XOR operation.

14. The method of claim 1, further comprising:
transmitting transmission data to a receiver through a communication channel, the transmission data comprising the plurality of coded words.

15. A transition encoder for encoding input data, the transition encoder comprising:
a processor; and
a processor memory local to the processor, wherein the processor memory has stored thereon instructions that, when executed by the processor, cause the processor to perform:
identifying an input packet of the input data, the input packet comprising a plurality of input words;
organizing the plurality of input words into a plurality of groups;
identifying a key group of the plurality of groups;
determining a key value based on one of the plurality of input words corresponding to the key group; and
generating a plurality of coded words based on the key value and the plurality of input words.

16. A method of decoding transmission data, the method comprising:
receiving the transmission data that comprises a plurality of coded words comprising a modified key value and a first coded word, the modified key value being a first one of the plurality of coded words;
generating a key value based on the modified key value by setting a bit from among bits of the modified key value to a value; and
generating a first decoded word of a plurality of decoded words based on the key value and the first coded word.

17. The method of claim 16, wherein the modified key value is expressed as:

$$[PRB_0 GID_0 POB_0],$$

where $PRB_0$ represents pre bits of the modified key value, $GID_0$ represents group identification (groupID) bits of the modified key value, and $POB_0$ represents post bits of the modified key value, and
wherein the generating the key value based on the modified key value comprises:
replacing a most significant bit (MSB) of the groupID bits of the key value with zero to generate the key value.

18. The method of claim 16, wherein the generating the key value comprises setting the bit to zero to generate the key value.

19. The method of claim 16, wherein the plurality of coded words is expressed as:

$$\{K', x_1 \wedge K, x_2 \wedge K, \ldots, x_N \wedge K\},$$

where $\{x_1, x_2, \ldots, x_N\}$ represent a plurality of words of an input packet, K represents the key value used to code the plurality of coded words, K' represents the modified key value, and ^ symbolizes a binary XOR operation.

20. The method of claim 16, wherein the receiving the transmission data comprises:
receiving the transmission data from a transmitter through a communication channel.

* * * * *